| United States Patent [19] | [11] Patent Number: 4,965,874 |
|---|---|
| Yamazaki | [45] Date of Patent: Oct. 23, 1990 |

[54] MAGNETIC RECORDING AND REPRODUCTION DEVICE WITH FAST FEED/REWIND HEAD TO TAPE SPEED CONTROL

[75] Inventor: Shohei Yamazaki, Hamamatsu, Japan

[73] Assignee: Yamaha Corporation, Hamamatsu, Japan

[21] Appl. No.: 165,924

[22] Filed: Mar. 9, 1988

[30] Foreign Application Priority Data

Mar. 10, 1987 [JP] Japan ................. 62-54974

[51] Int. Cl.$^5$ .................. G11B 5/52; G11B 15/18
[52] U.S. Cl. ...................... 360/70; 360/73.09
[58] Field of Search ............ 360/70, 73.01, 73.02, 360/73.11, 73.09

[56] References Cited

U.S. PATENT DOCUMENTS

| 4,426,668 | 6/1981 | Itoh | 360/70 |
| 4,630,142 | 12/1986 | Tani et al. | 360/70 |
| 4,794,473 | 12/1988 | Kawasaki | 360/70 |
| 4,829,387 | 5/1989 | Kato | 360/73.09 |

Primary Examiner—Robert L. Richardson
Assistant Examiner—David L. Robertson
Attorney, Agent, or Firm—Spensley Horn Jubas & Lubitz

[57] ABSTRACT

A magnetic recording and reproducing device of a type recording and reproducing a signal on a magnetic recording medium such as a tape by using a rotary head and performing a tracking control by detecting crosstalk components of pilot signals on left and right adjacent tracks and comparing these components with each other comprises a pilot signal detection circuit for detecting a pilot signal during fast feeding or rewinding of the magnetic recording medium and speed control circuit for controlling at least one of rotation speed of the rotary head and running speed of the magnetic recording medium so that the pilot signal can be detected substantially at its predetermined frequency during the fast feeding or the rewinding. A speed control servo loop is formed during fast feeding or rewinding so as to detect a pilot signal substantially at its predetermined frequency so that a substantially predetermined relative speed between the magnetic recording medium and the rotary head is maintained and information recorded on the magnetic recording medium can be read in a stable manner.

8 Claims, 9 Drawing Sheets

MAGNETIC RECORDING AND REPRODUCTION DEVICE WITH FAST FEED/REWIND HEAD TO TAPE SPEED CONTROL

BACKGROUND OF THE INVENTION

This invention relates to a magnetic recording and reproducing device and, more particularly, to a rotary head type magnetic recording and reproducing device such as an R-DAT (rotary head type digital audio tape recorder) capable of reading information recorded on a recording tape in a stable manner during fast feeding or rewinding of the recording tape.

The R-DAT is a device which converts analog signals such as an audio signal into PCM signals, records the PCM signals on a magnetic tape and reproduces the same.

As shown in FIG. 2, the device comprises a rotary head 2 having two magnetic heads A and B separated by 180 degree interval on the circumferential surface of a cylinder 1. A tape 3 is loaded from a casette housing 4 with a vertical post 5 or with an inclined post 6, wound on the circumferential surface of the rotary head 2 for 90 degrees, supported by a fixed guide 7, and run by a capstan 8 and a pinch roller 9.

The diameter of the rotary head 2 is 30 mm, and the winding angle for the tape is 90 degrees. For recording and reproduction, at the mode I which is usually used, the rate of the rotary head 2 is 2,000 rpm (circumferential speed: 3.14 m/sec) and the speed of the tape 3 at 8.15 mm/sec in the direction identical to that of the rotary head 2. The relative speed of the head 2 as against the tape 3 is 3.13 m/sec.

The recording system with R-DAT is a helical scanning azimuth recording. Its tape format as shown in FIG. 3 defines with the track angle of 6° 22′ 59.5″ and azimuth angle of ±20° with the tracks alternately traced by two heads A and B.

FIG. 4 shows a track format wherein audio data are recorded at the center of a PCM region, and sub-codes and control signals such as ATF (automantic track finding) are recorded on both sides thereof.

The PCM region comprises 128 blocks as shown in FIG. 5 each of which has recording regions for a block synchronizing (indicating the starting position of the block), ID (identification) code, block address, parity check code, and audio data. At the mode I, audio data uses 2's complement codes of quantization bit of 16 bits of the sampling frequency of 48 kHz, and the PCM data is divided into 8 bits in higher order and 8 bits of lower order, modulated from 8 bits into 10 bits (8-10 modulation) and recorded in 10 bits.

In the sub-code region (8 blocks), data such as music number and time data are recorded. An example of a format in the sub-code region (for one block) is shown in FIG. 6.

For tracking control during reproducing in the R-DAT, an automatic tracking system with ATF is employed. ATF system detects and compares crosstalks from two adjacent tracks by ATF signals (FIG. 4) recorded on the tracks, and controls the speed of the capstan motor for running tape so as to make crosstalks identical. By this arrangement, the head A is caused to trace a track whose azimuth is +20° (hereinafter referred to as A track) and the head B is caused to trace a track whose azimuth is −20° (hereinafter referred to as B track). These heads A and B can respectively trace a width which is about one and half times each track width.

In a magnetic recording and reproducing device such as R-DAT, it will be very convenient if information recorded on the tape can be reproduced even partially during fast feeding (feeding of the tape at a speed which is higher than a normal playback speed) or rewinding (feeding of the tape in a reverse direction to the normal playback direction).

In an R-DAT, for example, it is important for designing the system as a convenient one to have capability of reading data such as present music number and time information recorded on the sub-code region during search (i.e., operation for detecting a desired music number or position in the music). Particularly, in fast search which is conducted at a high speed such as 200 times as fast as the normal speed, it will be extremely difficult to detect a desired tape position unless such data can be read in a stable manner.

In fast search in an R-DAT, the head traces plural tracks, crossing these tracks obliquely as shown in FIG. 7 and passes over a sub-code region of one of these tracks in one crossing. If the relative speed between the head and tape is deviated largely from predetermined relative speed (3.13 m/sec in the case of R-DAT), reproduction of clock cannot be made even if a signal is obtained from the head and, as a result, a sub-code cannot be read. For reading a sub-code, it is necessary for the relative speed between the tape and head to be within a range in which clock can be reproduced (i.e., range in which the relative speed can be subjected to the PLL control for reproduction of clock).

It is, therefore, an object of the invention to provide a magnetic recording and reproducing device capable of adjusting, with a simple construction, the relative speed between the tape and head during fast search conducted at a speed of, for example, 200 times as fast as the normal speed.

SUMMARY OF INVENTION

For achieving the above described object of the invention, it is a feature of the invention to detect a pilot signal used for the ATF control during fast feeding or rewinding a magnetic recording medium such as a tape and control at least one of rotary head driving speed and running speed of the magnetic recording medium so that the pilot signal can be detected at its substantially predetermined frequency.

The magnetic recording and reproducing device according to the invention is characterized in that it comprises a rotary head incorporating a plurality of heads for recording and reproducing an input signal by tracing a magnetic recording medium, said heads also reproducing signals recorded on left and right adjacent tracks simultaneously, and data recorded on the magnetic recording medium including the input singal, a synchronizing signal used for timing control of recording and reproducing of the input signal and a pilot signal of a predetermined frequency used for tracking control; tracking control means comprising tracking error signal generation means for generating, based on the timing of the synchronizing signal, a tracking error signal by detecting crosstalk components of the pilot signals on left and rigth adjacent tracks and comparing these components with each other, and first speed control means for controlling, responsive to the tracking error signal, a relative speed of the magnetic recording medium with respect to the heads of the rotary head; pilot signal detection means for detecting a pilot signal during fast feeding or rewinding of the magnetic recording medium; and second speed control means for controlling at least one of rotation speed of the rotary head and running speed of the magnetic recording medium during the fast feeding or rewinding of the media so that the pilot signal can be detected substantially at its predetermined frequency.

According to the invention, a speed control servo loop is formed during fast feeding or rewinding so as to detect a pilot signal substantially at its predetermined frequency so that a substantially predetermined relative speed between the magnetic recording medium and head is maintained even for the fast feeding or rewinding of any speed and information recorded on the magnetic recording medium can be read in a stable manner.

If one of rotation speed of the rotary head and running speed of the magnetic recording medium is changed, the other speed is controlled so that the pilot signal is detected substantially at the predetermined frequency and this enables stable reading of information recorded on the magnetic recording medium without substantial change in the relative speed. If, accordingly, the invention is applied to fast searching in an R-DAT, sub-code information can be read stably and the target position can thereby be accurately detected.

The device according to the invention can be constructed with a very simple circuit design because it utilizes a pilot signal and a rotary head which are already provided in the conventional magnetic recording and reproducing device.

The device according to the invention can be used not only for reading control information such as sub-code but also for reading recorded data on the magnetic recording medium itself.

The invention is applicable not only to an R-DAT but also to other rotary head type magnetic recording and reproducing devices such as video tape recorders.

A preferred embodiment of the invention will be described with reference to the accompanying drawings.

BRIEF DESCRIPTION OF THE DRAWINGS

In the accompanying drawings.

DESCRIPTION OF PREFERRED EMBODIMENTS

A preferred embodiment of the invention will now be described.

In this embodiment, the invention is applied to reading of sub-code information during fast searching in an R-DAT. A pilot signal used in this invention is easy to discriminate from other signals since it is recorded at the lowest frequency of all signals recorded on the tape. Besides, even if there is crosstalk between adjacent tracks, pilot signals in the adjacent tracks are never detected simultaneously according to the format so that they do not interfere each other. Since pilot signals are of low frequency, azimuth loss is small and therefore a pilot signal on the B track can be also read with the head A and a pilot signal on the A track can be also read with the head B. Furthermore, pilot signals are recorded on the tape for a longer period of time than synchronizing signals in ATF signals so that the pilot signals are easier to detect. For these reasons, an accurate control can be expected by utilizing pilot signals.

Figure 1A:
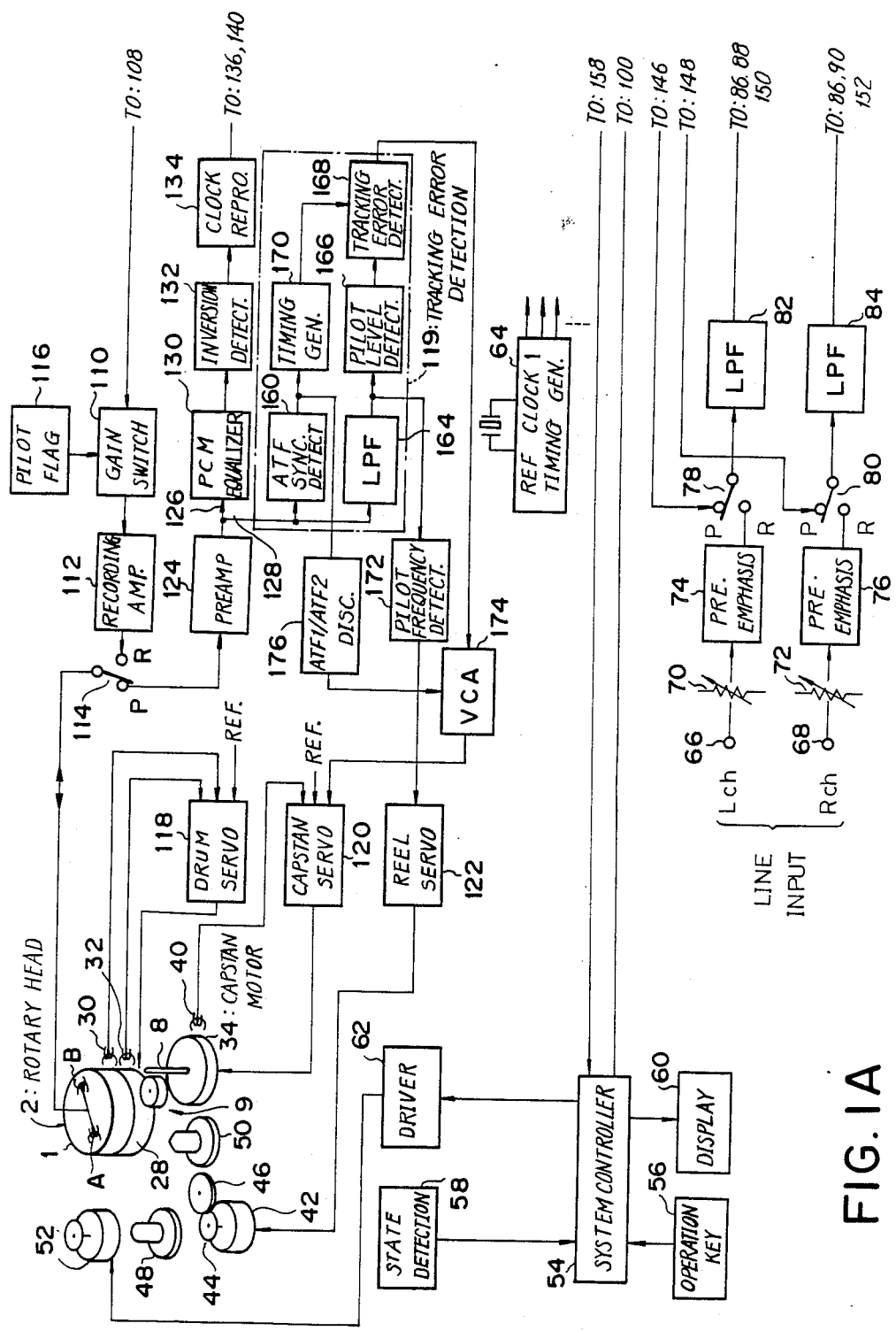
FIGS. 1A and 1B are block diagrams showing an embodiment in which this invention is applied to an R-DAT.
Figure 1B:
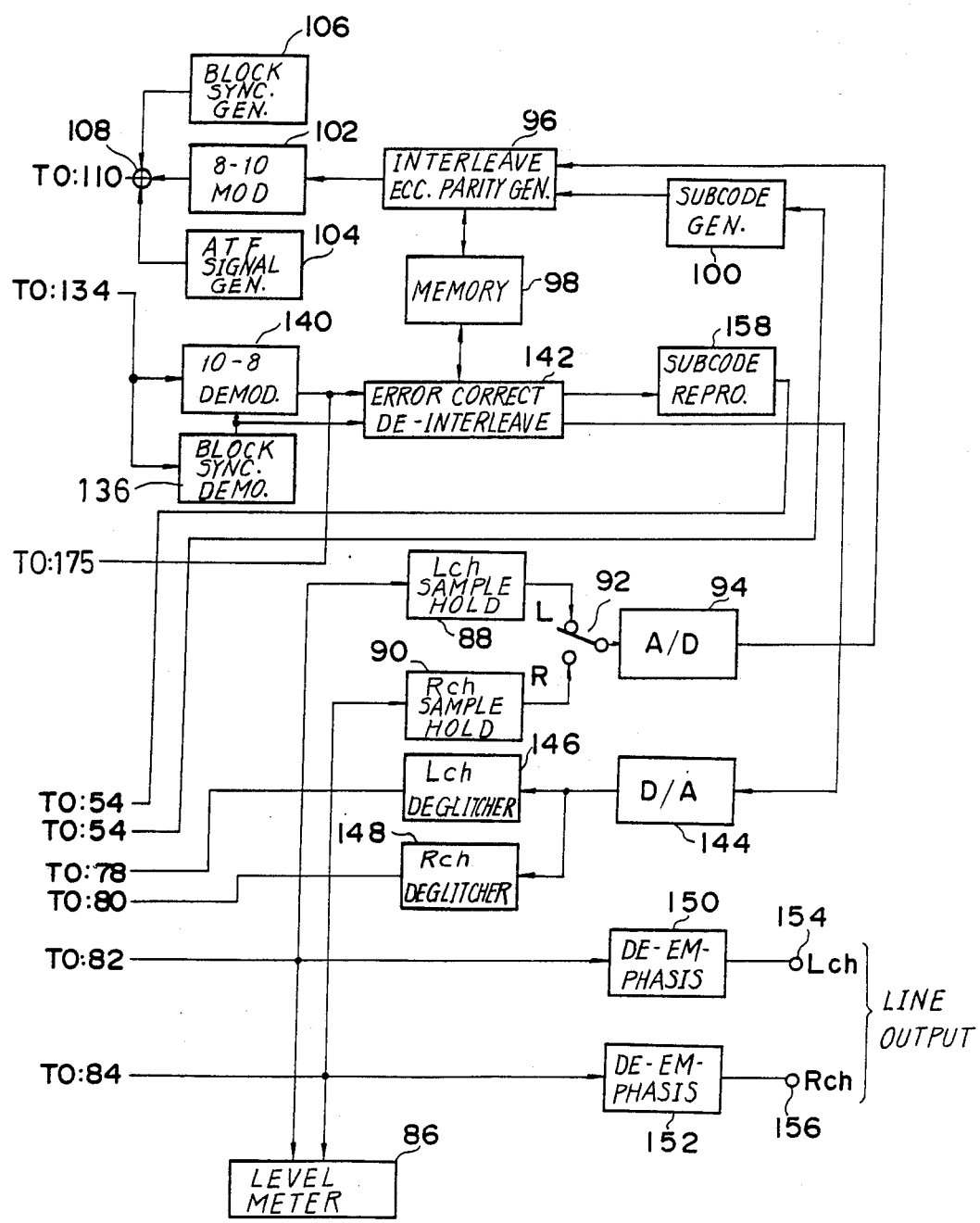
Figure 2:
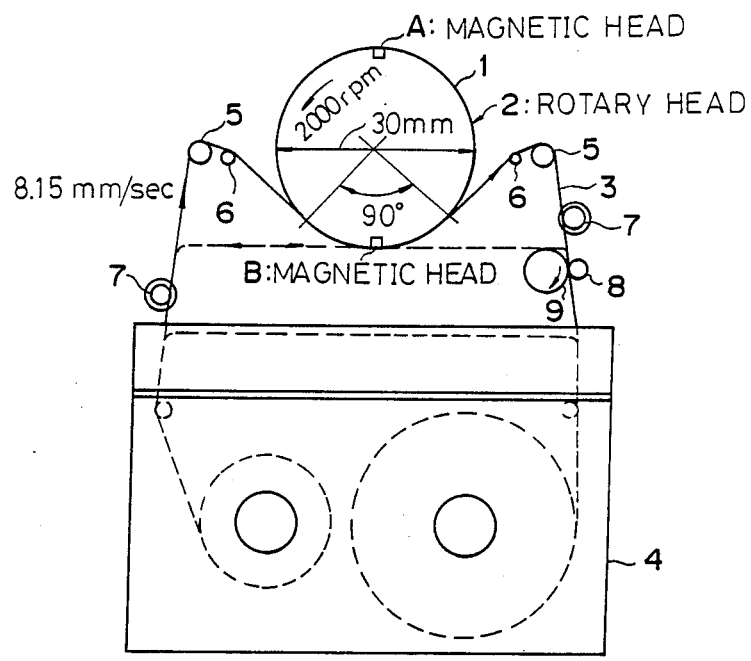
FIG. 2 is a view showing the mechanism of the R-DAT.
Figure 3:
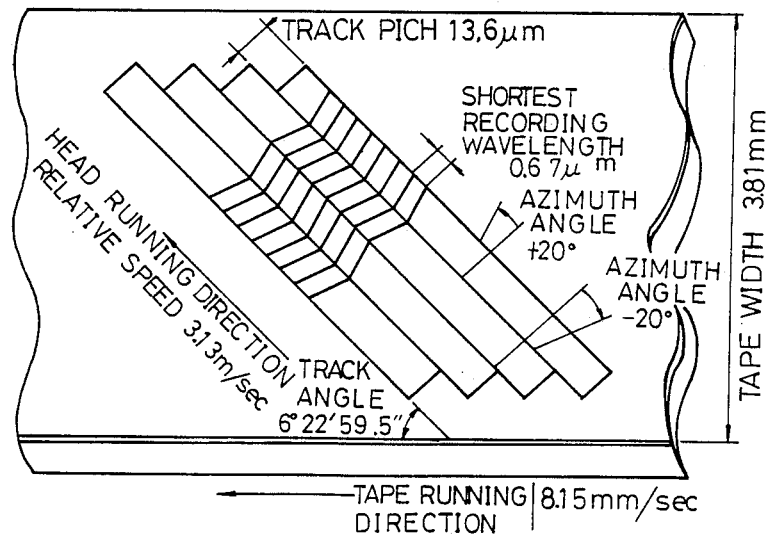
FIG. 3 is a tape format used for the R-DAT.

FIGS. 1A and 1B show an entire construction of R-DAT to which this invention has been applied.

A system controller 54 comprises a microcomputer and controls operations at each section in accordance with contents of commands issued by a keyboard 56 or detection section 58 inside the system, displaying necessary items such as music number and time on a display 60.

A reference clock/timing generation circuit 64 generates various reference clocks and timing signals to be used in the signal processing system or servo processing system by quartz oscillation outputs.

A rotary head 2 has two magnetic heads A and B arranged on the circumferential surface of a cylinder 1 at an interval of 180 degrees. The head 2 is driven by a drum motor 28. The head 2 is further provided with an FG (frequency generator) 30 for speed detection and a PG (phase generator) 32 for reference rotational position detection.

A capstan motor 34 comprises a motor shaft comprising a capstan 8, and a pinch roller 9 abuts on the capstan 8 to control and run the tape. An FG 40 is provided on the capstan motor 34 for speed detection.

A reel motor 42 drives reel tables 48 and 50 via pulleys 44 and 46 to wind the tape. Fast feeding and rewinding are effected by releasing engagement between the pinch roller 9 and the capstan 8 and driving the reel motor 42. During fast feeding, the pulley 46 is caused to abut against the reel table 50 and the reel table 50 is driven whereas during rewinding, the pulley 46 is caused to abut against the reel table 48 and the reel table 48 is driven. A loading motor 52 loads casettes and tapes, and is actuated by a driver 62 responsive to a command from the system controller 54.

Description will now be made as to the rest of the device with respect to operations during recording, reproduction and fast search.

(1) During Recording

Analog audio signals of right and left channels are applied from input terminals 66 and 68. These signals are adjusted in recording level by attenuaters 70 and 72, pre-emphasized by pre-emphasis circuits 74 and 76 and supplied to switches 78 and 80.

The switches 78 and 80 are connected to the "R" side at the time of recording and supplies input analog signals to low-pass filters 82 and 84. The low-pass filters 82 and 84 are provided in order to attenuate unnecessary high frequency components in input signals and prevent aliasing due to sampling. They have cut-off frequency which is about one half of the sampling frequency. The low-pass filters 82 and 84 function as demodulating filters in the reproduction mode. A level meter 86 displays recording level and reproducing level.

The output analog signals from the low-pass filters 82 and 84 are applied to sample hold circuits 88 and 90 to be sampled therein with a predetermined sampling frequency (48 kHz at R-DAT mode I).

The data from both channels are provided on a time shared basis by switching a switch 92 alternately, and converted into digital data (data of 16 bits for one channel) which forms the PCM data by an analog-to-digital converter 94.

The PCM data is divided into the upper order 8 bits and lower order 8 bits, and applied to an interleave/ECC parity generation circuit 96 for interleaving (rearrangement of data), parity generation (addition of error correction codes), addition of ID codes (identification codes), etc. via a memory 98. Sub-codes are prepared by a sub-code generation circuit 100 based on the data on the music number or time which are provided by the system controller 54.

The PCM data is applied to an 8-10conversion circuit 102 which converts 8-bit data into 10-bit data respectively in a certain manner (i.e., in such a manner that the band is narrowed by restricting the interval of reversing magnetization and make DC current component zero).

A block synchronizing signal generation circuit 106 generates block synchrozing signals (refer to FIG. 5) which are placed at the beginning of a block respectively, a block being a basic unit of a track format. An ATF signal generation circuit 104 generates pilot signal f1, synchronizing signals f2 and f3, etc. which form respective patterns of ATF1 and ATF2. These signals are combined by a synthesizing circuit 108 in a suitable manner for the track format in FIG. 4. In this manner, a series of data which are to be recorded on a track are prepared.

These prepared series of data are applied to a switch 114 via a gain switch circuit 110 and a recording amplifier 112. The gain switch circuit 110 lowers the gain in accordance with a pilot flag from a circuit 116, which is raised during the period while the pilot signal f1 or ATF signal (FIG. 8) is being produced. Since the frequency of the pilot signal is low, if it is recorded with the same gain as other signals (or with the same recording current), this period alone is recorded excessively not to be easily erased when "over-write" occurs. The gain is therefore reduced to prevent such inconvenience during the period of the pilot signals to lower the recording current. The recording amplifier 112 amplifies the data signal to be recorded to the level necessary to record it on the tape with the head 2. The switch 114 is connected to the "R" side at the recording, and feeds the output from the amplifier 112 to the heads A and B of the rotary head 2 to record the series of data on the tape.

A drum servo circuit 118 compares the rotation detection signals produced by FG 30 and PG 32 with the reference clock produced by the reference clock/timing generation circuit 64 in frequency and phase in the recording mode to control the rotation of the drum motor 28 normally to 2,000 rpm through PLL control. The drum servo circuit 118 controls the rotation phase of the rotary head 2 for setting the detection timing of the data fed to the heads A and B and that of the reference position detected by PG 32 at a predetermined timing so that the data for one track supplied from the amplifier 112 may be correctly recorded on one track on a tape in accordance with a format shown in FIG. 4.

The capstan servo circuit 120 controls the capstan motor 34 in PLL-control to set the tape speed at a predetermined rate (8.15 mm/s) by comparing the output from FG. 40 with the reference clock in frequency and phase.

A reel servo 122 drives a reel motor 42 to optimally suspend the tape without sagging.

(2) During reproduction

All the switches 78, 80, and 114 are connected to the "p" side in the reproduction mode. The signals recorded on the tape are read by the heads A and B and applied to a preamplifier 124 via the switch 114. The output from the pre-amplifier 124 is fed to a PCM path 126 for reproducing PCM data and a controller path 128 for tracking control respectively.

The data fed in the PCM path 126 is compensated with respect to the frequency and phase characteristics of the heads A and B at a PCM equalizer 130 to open an eye pattern. The output from the PCM equalizer 130 is shaped in waveform into the digital signals of "1" and "0" by an inversion detecting circuit 132. Clock signal is also reproduced in a clock reproducing circuit 134.

The digital data which has been waveform-shaped is applied to a block synchronizing signal demodulation circuit 136 to be demodulated for identifying the beginning position of the data. It is also demodulated into the original data of the upper order 8 bits and the lower order 8 bits by a 10-8 demodulation circuit 140.

An error correction/de-interleave circuit 142 rearranges the reproduced data into the original pattern and corrects errors via a memory 98.

The corrected data now has 16 bits as the lower and upper 8 bits are combined. They are converted again to analog signals by a digital-to-analog converter 144. The analog signals are separated into the right and left channels and removed of unnecessary components by de-glitchers 146, 148. It is demodulated into the original audio signals by low-pass filters 82 and 84 via the switches 78 and 80, de-emphasized by de-emphasize circuits 150 and 152, and guided to output terminals 154 and 156 respectively.

The sub-codes reproduced at a sub-code reproduction circuit 158 are fed to the system controller 54 to be used for display the musical number or time on the display 60 or for searching. Data such as date of recording, name of music and play time can also be recorded in the sub-code so that the sub-code can be utilized also for these data.

By the operation of the drum servo circuit 118, the rotary head 2 is rotated at a predetermined rate in response to the reference clock in a manner similar to the recording mode.

The reproduced signals supplied to the control path 128 are applied to a tracking error detection circuit 119. The tracking error detection circuit 119 detects a tracking error in the ATF tracking control.

ATF system detects and compares crosstalks from two adjacent tracks by ATF signals recorded on the tracks, and controls the speed of the capstan motor for running tape so as to make crosstalks identical.

The principle of detection of a tracking error in the ATF control will now be described.

Figure 4:
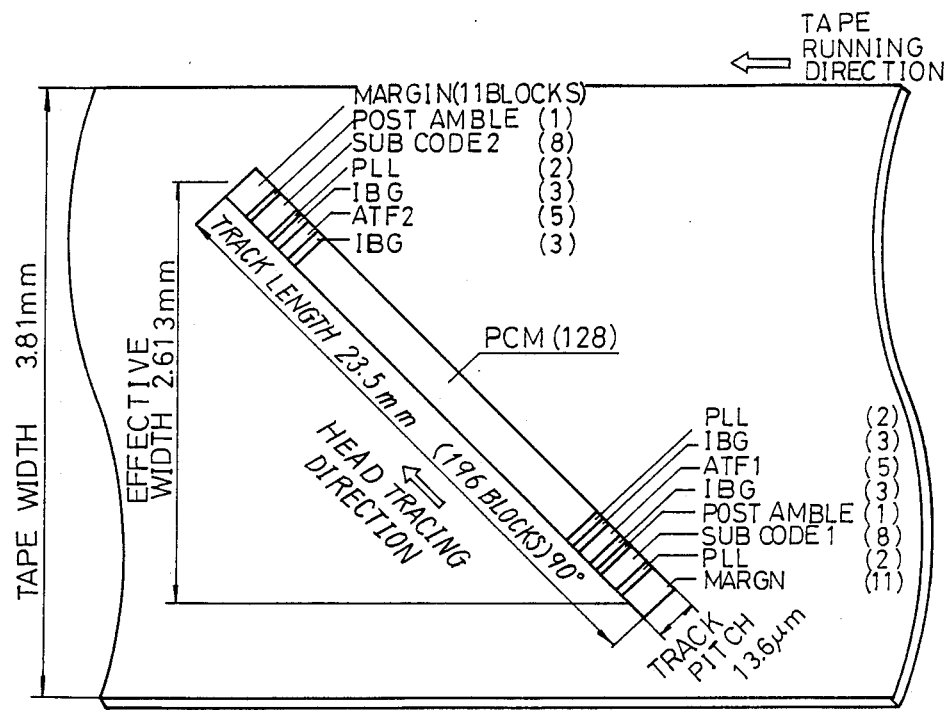
FIG. 4 is a track format of the R-DAT.
Figure 5:
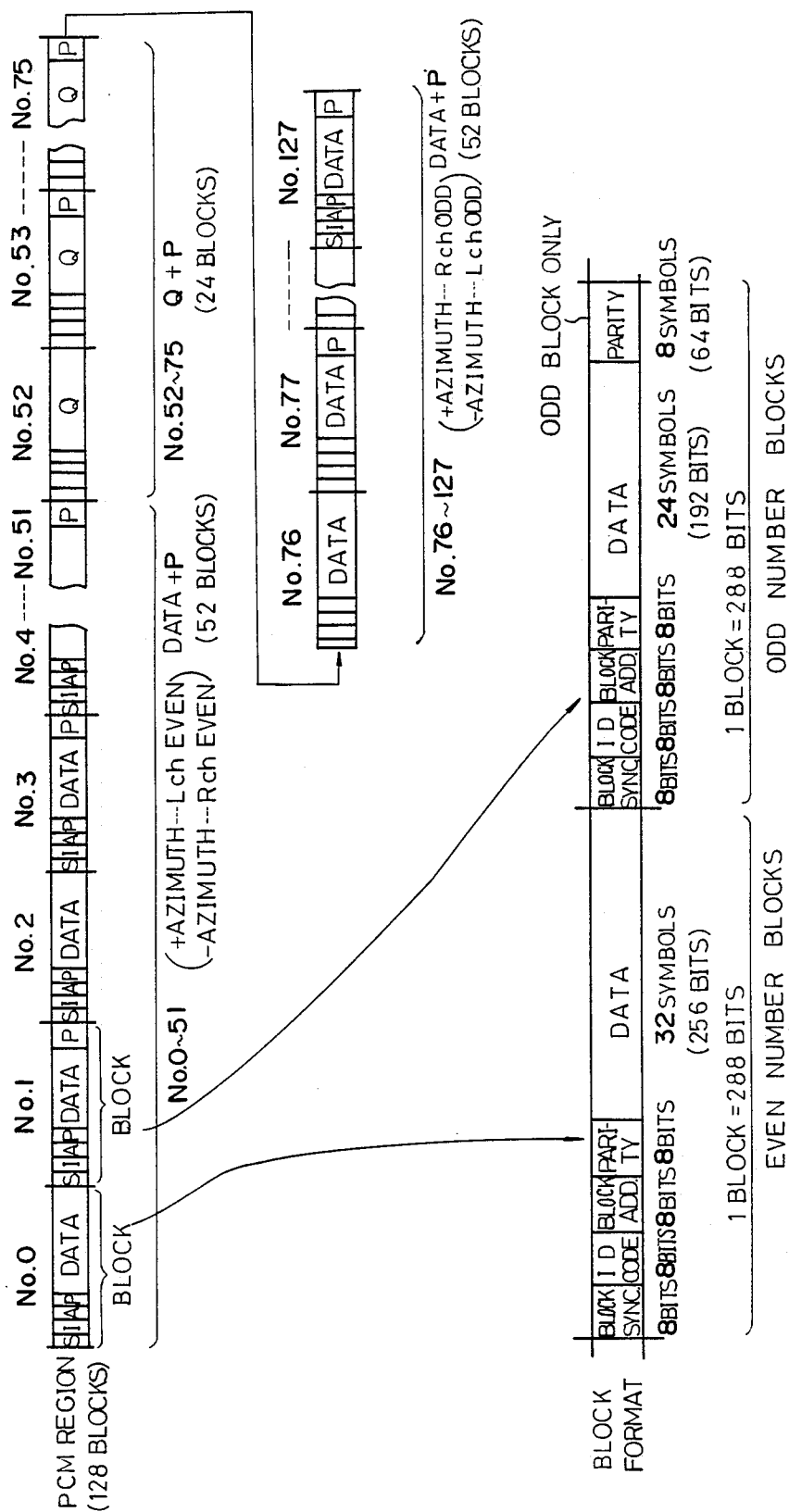
FIG. 5 is a format of PCM region shown in FIG. 4.
Figure 6:
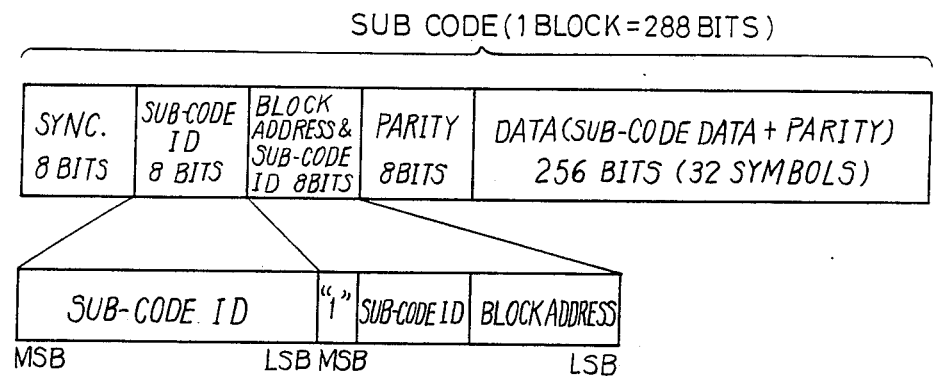
FIG. 6 is a format of sub-code region (for one block) shown in FIG. 4.
Figure 7:
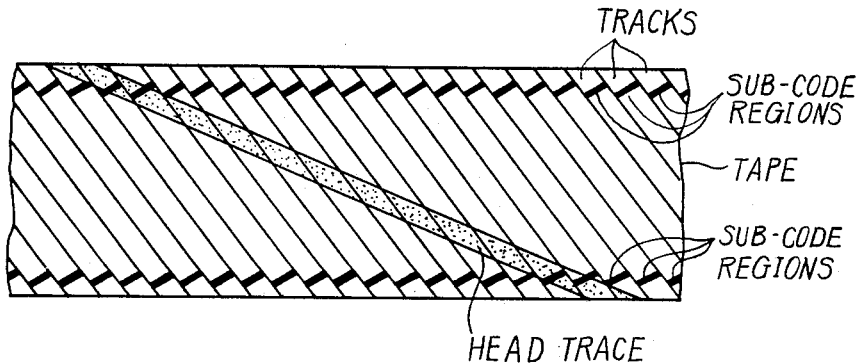
FIG. 7 is a view showing head trace during fast searching in the R-DAT.

ATF signals are recorded at two locations on one track, i.e., ATF1 and AFT2, as shown in FIG. 4. As shown in the format in FIG. 8, pilot signal f1 and synchronizing signal f2 (or f3) are recorded on each track. The frequencies are specified respectively;

f1 = 130.67 kHz f2 = 522.67 kHz f3 = 784.00 kHz

The frequency f1 is low enough not to have much azimuth loss. The head A traces the track of the synchronizing signals of f2. The head B traces the tracks of the synchronizing signals of f3. The track length of a synchronizing signal differs between an odd number frame and an even number frame, which are defined as one (1) block and 0.5 block respectively.

Figure 8:
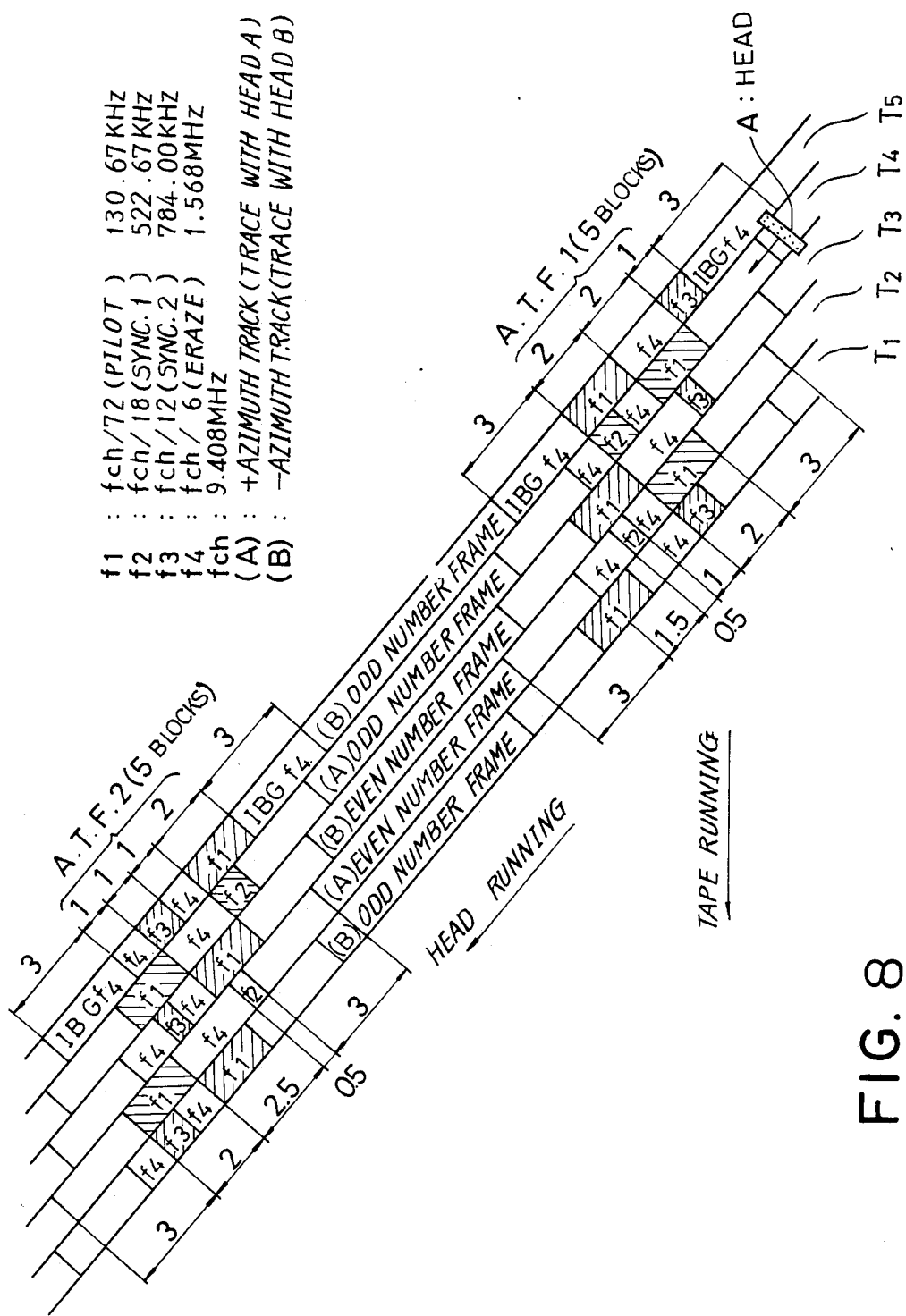
FIG. 8 is a format of ATF1 and ATF2 in FIG. 4.

If it is assumed that, as shown in FIG. 8, the head A is tracing the track T4, pilot signals f1 of adjacent tracks T3 and T5 are obtained from the head A due to crosstalks in addition to a reproduced signal from the track T4. This is because the head has a width 1.5 times as large as a track. If the head A is tracing the track T4 correctly, crosstalks from the tracks T3 and T5 become equal, but if the head is deviated to either direction, the crosstalks from them become different from each other. The crosstalks from the adjacent tracks T5 and T3 are detected by detecting amplitude levels of the pilot signal f1 on the track T5 and of the pilot signal f1 of the track T3 at the detection timing of the synchronizing signal f2 of the track T4. The difference in the crosstalks therefore is presumed to represent tracking errors.

The tracking error detection circuit 119 in FIG. 1 detects a tracking error on the basis of the above described principle. More specifically, the tape reproducing signal applied to the tracking error detection circuit 119 is applied to an ATF synchronizing signal detection circuit 160 to detect synchronizing signals f2 and f3 in the ATF signals. A low-pass filter 164 extracts the crosstalk components of the pilot signal f1 from the adjacent tracks within the ATF signal. A pilot level detection circuit 166 detects the level of the crosstalk components, and a tracking error detection circuit 168 calculates the difference between the levels of the corsstalk components with the timing signal generated from a timing generation circuit 170 based on the synchronizing signals f2 and f3 to detect tracking errors. The tracking error signals are fed to the capstan servo circuit 120 via a VCA 174. The capstan servo circuit 120 controls the revolution rate of the capstan motor 34 so as to reduce the tracking errors to zero and thereby control the tape running speed.

The ATF1/ATF2 discrimination circuit 176 judges whether the detected ATF signal is ATF1 or ATF2 in order to switch gains. More specifically, if ATF1 is detected, the circuit switches the gain to a higher gain G1 whereas if ATF2 is detected, it switches the gain to a lower gain G2. The ratio of the gain G1 against G2 is expressed as G1:G2 = t2:t1 wherein t1 is the time duration the error signals obtained at ATF1 is effective whereas t2 is the duration of time the error signals obtained at ATF2 is effective. In other words, the ratio of the gain is in inverse proportion to the ratio of time interval.

This equalizes the effects of tracking error signals obtained in ATF1 and ATF2 in the tracking servo even when t1 is not equal to t2 (details are described in Japanese patent application No. 309496/1986).

An ATF1/ATF2 discrimination circuit 176 may discriminate ATF1 from ATF2 by positional relation in respect of PCM. More particularly, as ATF1 is located before the PCM region in one track while ATF2 is located after the region, it can identify them positionally. Alternatively, if the output pulse from PG 32 can be obtained at the timing to start the track, the first ATF signal after the output pulse from PG 32 may be judged as ATF1 and the second may be judged as ATF2.

The pilot frequency detection circuit 172 is a circuit for fast searching which detects a pilot signal f1 among the ATF signals. During fast searching, it is necessary to occasionally read data such as start ID, music number and time data out of the recorded content on the tape in order to "fast forward" or "rewind" the tape at a target position. For the purpose, the relative speed between the heads A and B and the tape should be restricted at a value substantially same as that of recording. Pilot signal f1 is used for controlling the speed. In other words, as the pilot signal f1 is recorded in 130.67 kHz, it controls the reel servo circuit 122 to set the pilot signal f1 detected in the search at the frequency. This enables reading of data such as start ID, music number and time data in sub-codes and feeding of the tape to the target position correctly.

(3) During Fast Searching

During fast searching, the capstan 8 is released from engagement with the pinch roller 9 and the reel 48 or 50 is driven by the reel motor 42 at a high speed (e.g., a speed which is 200 times as fast as the normal speed) to feed the tape quickly or rewind it in a state in which the tape is in contact with the rotary head 2. During this mode, signals reproduced from the tape are obtained from the rotary head 2. Data such as start ID, music number and time information are detected from the sub-code information in the reproduced signals and these data are compared with a predetermined target position to control fast feeding or rewinding of the tape whereby fast searching of the target position can be performed.

As described before, it is necessary, for reproducing sub-code information from a reproduced signal from the rotary head 2, to control the relative speed between the tape and the rotary head 2 so that it is maintained within a range not deviating largely from a predetermined speed (3.13 m/sec), i.e., within a range in which the relative speed can be subjected to the PLL control for reproduction of clock. For effecting this control of the relative speed, the pilot signal f1 in the ATF signals is utilized. Since the pilot signal f1 is recorded at 130.67 KHz, at least one of the tape speed and the rotation speed of the rotary head 2 is controlled so that the pilot signal f1 can be detected at this predetermined frequency during fast searching.

In FIG. 1, the pilot signal f1 is detected by the low-pass filter 164. Since the pilot signal f1 is of the lowest frequency of all signals recorded on the tape, it can be readily detected by the low-pass filter 164. The frequency of this detected pilot signal f1 also is subject to variation. Since, however, synchronizing signal f2 which is of the next lowest frequency to the pilot signal f1 has frequency of 522.67 KHz which is four times as high as the pilot signal f1, the pilot signal f1 can be discriminated from other signals and extracted without fail despite some frequency variation due to variation in the relative speed by setting the cut-off frequency of the low-pass filter 164 at about 200 KHz.

Figure 9:
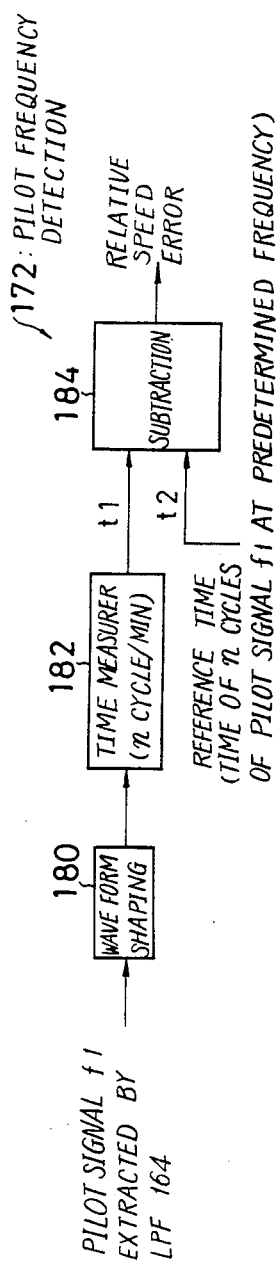
FIG. 9 is a block diagram showing a specific example of a pilot frequency detection circuit 172 in FIG. 1.

The pilot frequency detection circuit 172 detects the frequency of the pilot signal f1 extracted in this manner and detects an error between the detected frequency and the predetermined frequency of 130.67 KHz. More specifically, the pilot frequency detection circuit 172 compares, as shown in FIG. 9 for example, the pilot signal f1 extracted by the low-pass filter 164 with a voltage which is caused to have a desired offset value from zero-cross point by a waveform shaping circuit 180 thereby to shape the waveform of the pilot signal f1 and then measures time t1 for n cycles of the pilot signal f1 with a time measurer 182. Then, the circuit 172 performs subtraction t2−t1 with a subtractor 184 using reference time t2 which consists of n cycles of the pilot signal f1 at the predetermined frequency and provides an error between the predetermined frequency and the detected pilot signal f1 as a relative speed error in the form of a voltage signal.

The relative speed error signal produced by the pilot signal frequency detection circuit 172 is applied to at least one of the reel servo 122 and the drum servo 118 in FIG. 1 to control at least one of the reel motor 44 and the drum motor 28 so that the frequency of the detected pilot signal f1 will become the predetermined frequency and the relative speed thereby will become the predetermined speed of 3.13 m/sec.

When the relative speed is controlled to the predetermined speed, clock can be reproduced from a head output signal and so reproduction of the head output signal can be made. This enables the sub-code reproduction circuit 158 to reproduce sub-code information in the head output signal. The system controller 54 searches for a preset position quickly by controlling fast feeding and rewinding of the tape upon comparing music number and time data in the music in this sub-code information with music number and time data which are preset as target position in the fast search.

Figure 10:
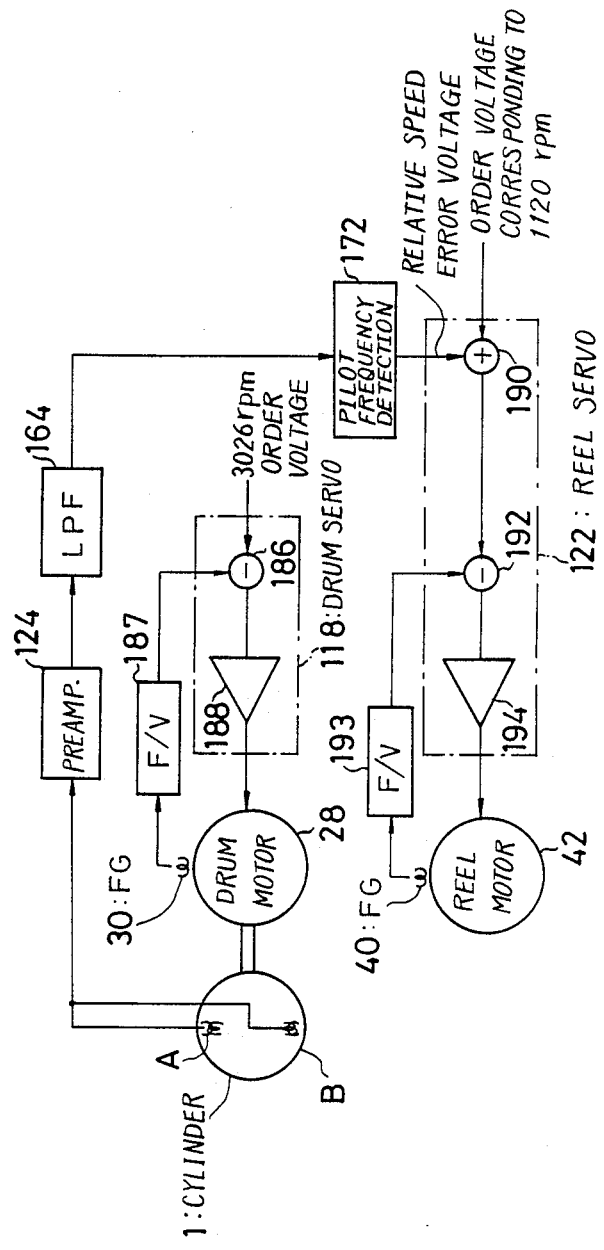
FIGS. 10 through 12 are block diagrams showing specific examples of controls of a drum servo 118 and a reel servo 122 during fast searching.
Figure 11:
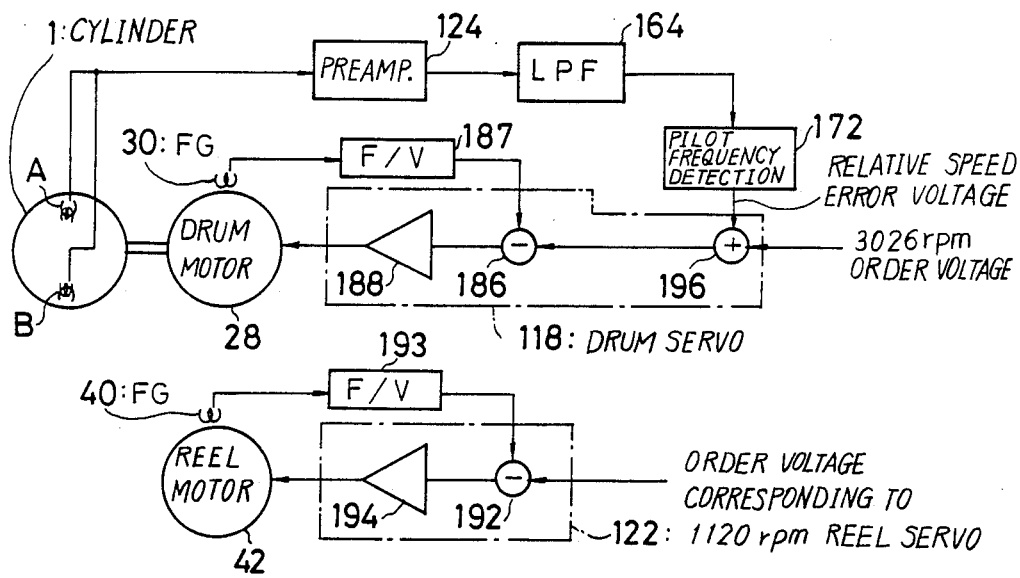
Figure 12:
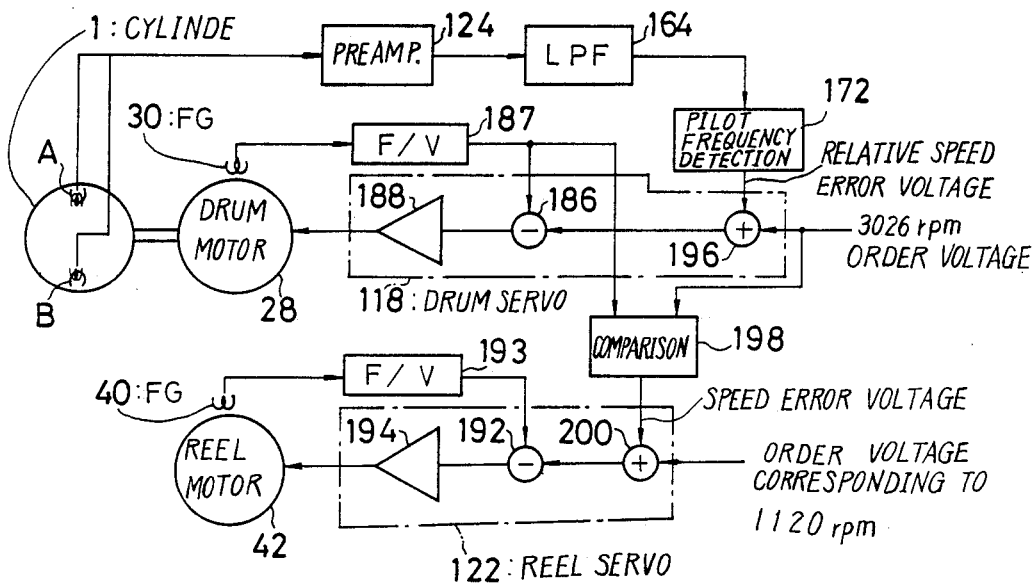

Specific examples of the drum servo 118 and the reel servo 122 for controlling the relative speed to the predetermined speed on the basis of the relative speed error are shown in FIGS. 10 through 12. Each of these examples will now be described.

(a) FIG. 10

This example is adapted to control the reel servo 122 with the relative speed error while imparting a revolution number order to the drum servo 118 as the rotary head servo system and the reel servo 122 as the tape running servo system for realizing a set multiple speed value. When fast feeding is made at two hundred-fold speed, the revolution number order of the drum servo 118 is 3026 rpm. As to the reel servo 122, the reel revolution number for realizing the same two hundred-fold speed varies with the diameter of the tape wound on the tape hub (e.g., 2100 rpm at the minimum diameter of the wound tape and 900 rpm at the maximum diameter of the wound tape in a certain type of tape). Accordingly, a reel motor revolution number order corresponding to a certain preset revolution number, e.g., a reel revolution number capable of realizing two hundred-fold speed when the diameters of the tape wound on the two tape hubs are equal to each other (1120 rpm in the above mentioned tape), is imparted. When rewinding is made at two hundred-fold speed, the revolution number order for the drum servo 118 is set at 964 rpm and the revolution number order for the reel servo 122 is set at the same speed as in fast feeding but in the reverse direction (−1120 rpm). The operation in fast feeding at two hundred-fold speed will be described by way of example below.

The outputs of the heads A and B are applied, as described before (FIG. 1), to the pilot frequency detection circuit 172 through the preamplifier 124 and the low-pass filter 164 and a relative speed error voltage is detected by the circuit 172.

In the drum servo 118, order voltage of 3026 rpm and a detection voltage obtained by frequency-voltage converting an output of the FG 30 by F/V (frequency-to-voltage) converter 187 are compared to each other by a comparator 186 and the drum motor 28 is controlled through a drive amplifier 188 so as to cause these voltages to coincide with each other.

In the reel servo 122, the relative speed error voltage is added to the order voltage corresponding to 1120 rpm in an adder 190, the sum voltage and a detection voltage obtained by frequency-voltage converting the output of the FG 40 by an F/V converter 193 are compared to each other by a comparator 192 and the reel motor 42 is controlled through a drive amplifier 194 so as to cause these voltages to coincide to each other.

By the above described operation, the speed of the reel motor 42 is controlled when there is a relative speed error and the relative speed is controlled to the predetermined value.

Since, in the example of FIG. 10, the reel servo 122 is controlled so that two hundred-fold speed is realized even if the diameter of the tape wound on the tape hub varies, two hundred-fold speed is maintained regardless of the diameter of the tape wound on the tape hub. In this example, however, the drum motor 28 continues its rotation at 3026 rpm even when load on the tape driving system becomes too large due to some outside factor to prevent the revolution number of the reel motor 42 from reaching the order speed and, accordingly, there is likelihood that the relative speed is deviated from the predetermined speed and therefore sub-code cannot be reproduced.

(b) FIG. 11

Contrary to the example shown in FIG. 10, the drum servo 118 is controlled with the relative speed error in this example.

In the drum servo 118, the relative speed error voltage is added to the order voltage corresponding to 3026 rpm in an adder 196, the sum voltage and a detection voltage obtained by frequency-voltage converting the output of the FG 30 by an F/V converter 187 are compared to each other by a comparator 186 and the drum motor 28 is controlled through a drive amplifier 188 so as to cause these voltages to coincide with each other.

In the reel servo 122, the order voltage corresponding to 1120 rpm and a detection voltage obtained by frequency-voltage converting the output of the FG 40 by an F/V converter 193 are compared to each other by a comparator 192 and the reel motor 42 is controlled through a drive amplifier 194 so as to cause these voltages to coincide with each other.

In the example of FIG. 11, contrary to the example of FIG. 10, the drum motor 28 is rotated in such a manner that the relative speed is maintained at the predetermined speed even when the revolution number of the reel motor 42 has dropped due to increase in the load to the tape driving system so that reproduction of sub-code is ensured. Since, however, the reel motor 42 is driven at a constant speed corresponding to 1120 rpm, the multiple speed is deviated from two hundred-fold speed depending upon the diameter of the tape wound on the tape hub.

(c) FIG. 12

This example is adapted to control the drum servo 118 with the relative speed error and control the reel motor 42 with a speed error of the drum motor 28 thereby to eliminate the disadvantage of the example of FIG. 11 and maintain a constant multiple speed.

In the drum servo 118, the relative speed error voltage is added to the order voltage corresponding to 3026 rpm, the sum voltage and a detection voltage obtained by frequency-voltage converting the output of the FG 30 by an F/V converter 187 are compared to each other by a comparator 186 and the drum motor 28 is controlled through a drive amplifier 188 so as to cause these voltages to coincide with each other.

In the reel servo 122, the order voltage of the drum motor 28 and the detection voltage from the F/V converter 187 are compared to each other by a comparator 198, the order voltage corresponding to 1120 rpm and this speed error voltage from the comparator 198 are added together by an adder 200, the sum voltage and a detection voltage obtained by frequency-voltage converting the output of the FG 40 by an F/V converter 193 are compared to each other by a comparator 192 and the reel motor 42 is controlled through a drive amplifier 194 so as to cause these voltages to coincide with each other.

In the example of FIG. 12, the relative speed is maintained at the predetermined speed by controlling the drum servo 118 with the relative speed error voltage. Besides, when the diameter of the tape wound on the tape hub is changed with resulting change in the speed of the drum motor 28 to match the relative speed with the predetermined speed, the amount of change in the speed is added as the speed error to the order voltage of the reel motor 42. Accordingly, the reel motor 42 is controlled in its speed so as to cause the drum motor 28 to maintain 3026 rpm while maintaining the relative speed at the predetermined speed so that two hundred-fold speed is maintained regardless of variation in the diameter of the tape wound on the tape hub.

In the above described embodiment, description has been made in the case where the tape running is controlled by the reel motor 42. In a case where the multiple speed number is low, however, the tape running may be controlled by the capstan motor 34.

What is claimed is:

1. A magnetic recording and reproducing device comprising:
    a rotary head incorporating a plurality of heads for recording and reproducing an input signal by tracing a magnetic recording medium, said heads also reproducing signals recorded on left and right adjacent tracks simultaneously, and data recorded on said magnetic recording medium including the input signal, a synchronizing signal used for timing control of recording and reproducing of said input signal and a pilot signal of a predetermined frequency used for tracking control;
    tracking control means comprising:
    tracking error signal generation means for generating, based on the timing of said synchronizing signal, a tracking error signal by detecting crosstalk components of the pilot signals on left and right adjacent tracks and comparing these components with each other; and
    first speed control means for controlling, responsive to the tracking error signal, a relative speed of said magnetic recording medium with respect to said heads of said rotary head;
    pilot signal detection means for detecting a pilot signal during fast feeding or rewinding of said magnetic recording medium; and
    second speed control means for controlling at least one of rotation speed of said rotary head and running speed of said magnetic recording medium during the fast feeding or rewinding of the magnetic recording medium so that said pilot signal can be detected substantially at its predetermined frequency.

2. A device as defined in claim 1 wherein
    said pilot signal detection means comprises means for detecting difference between frequency of the detected pilot signal and the predetermined frequency of said pilot signal as relative speed error, and
    said second speed control means comprises;
    a rotary head servo system for controlling revolution number of a drive source of a rotary head cylinder by using, as an ordered value, revolution number of the rotary head cylinder corresponding substantially to set multiple speed during fast feeding or rewinding, and
    a magnetic recording medium running servo system for controlling revolution number of a drive source of said magnetic recording medium by using, as an ordered value, a value obtained by adding said relative speed error to revolution number of said magnetic recording medium drive source corresponding substantially to the set multiple speed of fast feeding or rewinding.

3. A device as defined in claim 1 wherein
    said pilot signal detection means comprises means for detecting difference between frequency of the detected pilot signal and the predetermined frequency of said pilot signal as relative speed error, and
    said second speed control means comprises;
    a rotary head servo system for controlling revolution number of a drive source of a rotary head cylinder by using, as an ordered value, a value obtained by adding said relative speed error to revolution number of said rotary head cylinder corresponding substantially to set multiple speed during fast feeding or rewinding, and
    a magnetic recording medium running servo system for controlling revolution number of a drive source of said magnetic recording medium by using, as an ordered value, revolution number of said drive source of said magnetic recording medium corresponding substantially to the set multiple speed during fast feeding or rewinding.

4. A device as defined in claim 1 wherein
    said pilot signal detection means comprises means for detecting difference between frequency of the detected pilot signal and the predetermined frequency of said pilot signal as relative speed error, and
    said second speed control means comprises;
    a rotary head servo system for controlling revolution number of a drive source of a rotary head cylinder by using, as an ordered value, a value obtained by adding said relative speed error to revolution number of said rotary head cylinder revolution number corresponding substantially to set multiple speed during fast feeding or rewinding, and a magnetic recording medium running servo system for controlling revolution number of a drive source of said magnetic recording medium by using, as an ordered value, a value obtained by adding difference between revolution number of said rotary head cylinder corresponding substantially to the set multiple speed during fast feeding or rewinding and actual revolution number of said rotary head cylinder to revolution number of said drive source of said magnetic recording medium corresponding substantially to the set multiple speed during fast feeding or rewinding.

5. A device as defined in claim 2 wherein said pilot signal detection means comprises time measuring means for measuring time length of the detected pilot signal and subtraction means for performing subtraction between the time length measured by said time measuring means and reference time length and providing the result of the subtraction as said relative speed error.

6. A device as defined in claim 3 wherein said pilot signal detection means comprises time measuring means for measuring time length of the detected pilot signal and subtraction means for performing subtractin between the time length measured by said time measuring means and reference time length and providing the result of the subtractin as said relative speed error.

7. A device as defined in claim 4 wherein said pilot signal detection means comprises time measuring means for measuring time length of the detected pilot signal and subtraction means for performing subtraction between the time length measured by said time measuring means and reference time length and providing the result of the subtraction as said relative speed error.

8. A device as defined in claim 1 wherein said first speed control means is a capstan servo system for controlling, responsive to said tracking error signal, rotation of a capstan which drives said magnetic recording medium.

* * * * *